US012652519B2

(12) United States Patent
  Gupta et al.

(10) Patent No.: US 12,652,519 B2
(45) Date of Patent: *Jun. 9, 2026

(54) STEERING OF ROAMING IN 5G SYSTEMS

(71) Applicant: Apple Inc., Cupertino, CA (US)

(72) Inventors: Vivek G. Gupta, San Jose, CA (US);
  Abhijeet Ashok Kolekar, Hillsboro,
  OR (US); Farid Adrangi, Lake
  Oswego, OR (US)

(73) Assignee: Apple Inc., Cupertino, CA (US)

( * ) Notice: Subject to any disclaimer, the term of this
  patent is extended or adjusted under 35
  U.S.C. 154(b) by 862 days.

This patent is subject to a terminal dis-
  claimer.

(21) Appl. No.: 17/530,776

(22) Filed: Nov. 19, 2021

(65) Prior Publication Data

US 2022/0078599 A1     Mar. 10, 2022

Related U.S. Application Data

(63) Continuation of application No. 16/276,968, filed on
  Feb. 15, 2019, now Pat. No. 11,184,756.

(Continued)

(51) Int. Cl.
  *H04W 8/04*     (2009.01)
  *H04W 8/06*     (2009.01)
  (Continued)

(52) U.S. Cl.
  CPC ............... *H04W 8/04* (2013.01); *H04W 8/16*
  (2013.01); *H04W 12/06* (2013.01);
  (Continued)

(58) Field of Classification Search
  CPC ....... H04W 8/04; H04W 76/38; H04W 76/50;
    H04W 76/27; H04W 12/108; H04W
      12/102; H04W 84/042
  See application file for complete search history.

(56) References Cited

U.S. PATENT DOCUMENTS

2005/0272449  A1*  12/2005  Gallagher ............. H04W 76/32
                                                      455/458
2013/0157700  A1*   6/2013  Chen ....................... H04L 51/58
                                                      455/466

(Continued)

*Primary Examiner* — Jinsong Hu
*Assistant Examiner* — Farideh Madani
(74) *Attorney, Agent, or Firm* — Kowert, Hood, Munyon,
Rankin & Goetzel, P.C.

(57) ABSTRACT

Systems and methods of providing steering of roaming
(SOR) information in a 5G VPLMN are described. A UE
receives a REGISTRATION ACCEPT message from an
AMF of the VPLMN during initial or mobility registration
of the UE in the VPLMN and DL NAS TRANSPORT
message thereafter. The message has a Payload container
information element (IE) set to secured packet. The SOR
information indicates a list of preferred PLMN/access tech-
nology combinations, which is uploaded to a memory after
a successful security check to verify that the list of preferred
PLMN/access technology combinations is provided by the
UDM of the HPLMN and is not tampered with by the
VPLMN. When the message also contains a request for
acknowledgment of successful security check of the list of
preferred PLMN/access technology combinations, the UE
transmits to the AMF the acknowledgment in a REGISTRA-
TION COMPLETE or a DL NAS TRANSPORT message.

20 Claims, 5 Drawing Sheets

Related U.S. Application Data

(60) Provisional application No. 62/632,097, filed on Feb. 19, 2018.

(51) Int. Cl.

| | |
|---|---|
| *H04W 8/16* | (2009.01) |
| *H04W 12/06* | (2021.01) |
| *H04W 12/102* | (2021.01) |
| *H04W 12/108* | (2021.01) |
| *H04W 76/27* | (2018.01) |
| *H04W 76/38* | (2018.01) |
| *H04W 76/50* | (2018.01) |
| *H04W 84/04* | (2009.01) |

(52) U.S. Cl.
CPC ....... *H04W 12/102* (2021.01); *H04W 12/108* (2021.01); *H04W 76/27* (2018.02); *H04W 76/38* (2018.02); *H04W 76/50* (2018.02); *H04W 84/042* (2013.01)

(56) References Cited

U.S. PATENT DOCUMENTS

| | | | |
|---|---|---|---|
| 2013/0231080 A1 | 9/2013 | Cheuk et al. | |
| 2015/0312873 A1* | 10/2015 | Cormier ............... | H04W 88/06 455/432.1 |
| 2016/0066235 A1 | 3/2016 | Bhat et al. | |
| 2017/0150332 A1 | 5/2017 | Palanisamy et al. | |
| 2017/0339609 A1 | 11/2017 | Youn et al. | |
| 2018/0109941 A1* | 4/2018 | Jain ....................... | H04W 60/00 |
| 2019/0116520 A1* | 4/2019 | Chaponniere .......... | H04W 4/20 |
| 2020/0015311 A1* | 1/2020 | Kim .................... | H04W 68/005 |
| 2020/0221281 A1* | 7/2020 | Rajadurai ............. | H04W 76/30 |

* cited by examiner

STEERING OF ROAMING IN 5G SYSTEMS

PRIORITY CLAIM

This application is a continuation of U.S. application Ser. No. 16/276,968, filed Feb. 15, 2019, which claims the benefit of priority under 35 U.S.C. 119(e) to U.S. Provisional Patent Application Ser. No. 62/632,097, filed Feb. 19, 2018, each of which is incorporated herein by reference in its entirety.

The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

TECHNICAL FIELD

Embodiments pertain to radio access networks (RANs). Some embodiments relate to cellular networks, including Third Generation Partnership Project Long Term Evolution (3GPP LTE) networks and LTE advanced (LTE-A) networks, $4^{th}$ generation (4G) networks and $5^{th}$ generation (5G) or next generation (NG) networks. Some embodiments relate to roaming of user equipment (UEs) in 5G systems.

BACKGROUND

The use of various types of systems has increased due to both an increase in the types of devices user equipment (UEs) using network resources as well as the amount of data and bandwidth being used by various applications, such as video streaming, operating on these UEs. To increase the ability of the network to contend with the explosion in network use and variation, the next generation of communication systems is being created. While the advent of any new technology, especially the introduction of a complex new communication system engenders a large number of problems both in the system itself and in compatibility with previous systems and devices, issues continue to abound in existing systems. For example, issues may arise in steering of roaming (SOR) in visited public land mobile network (VPLMN).

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
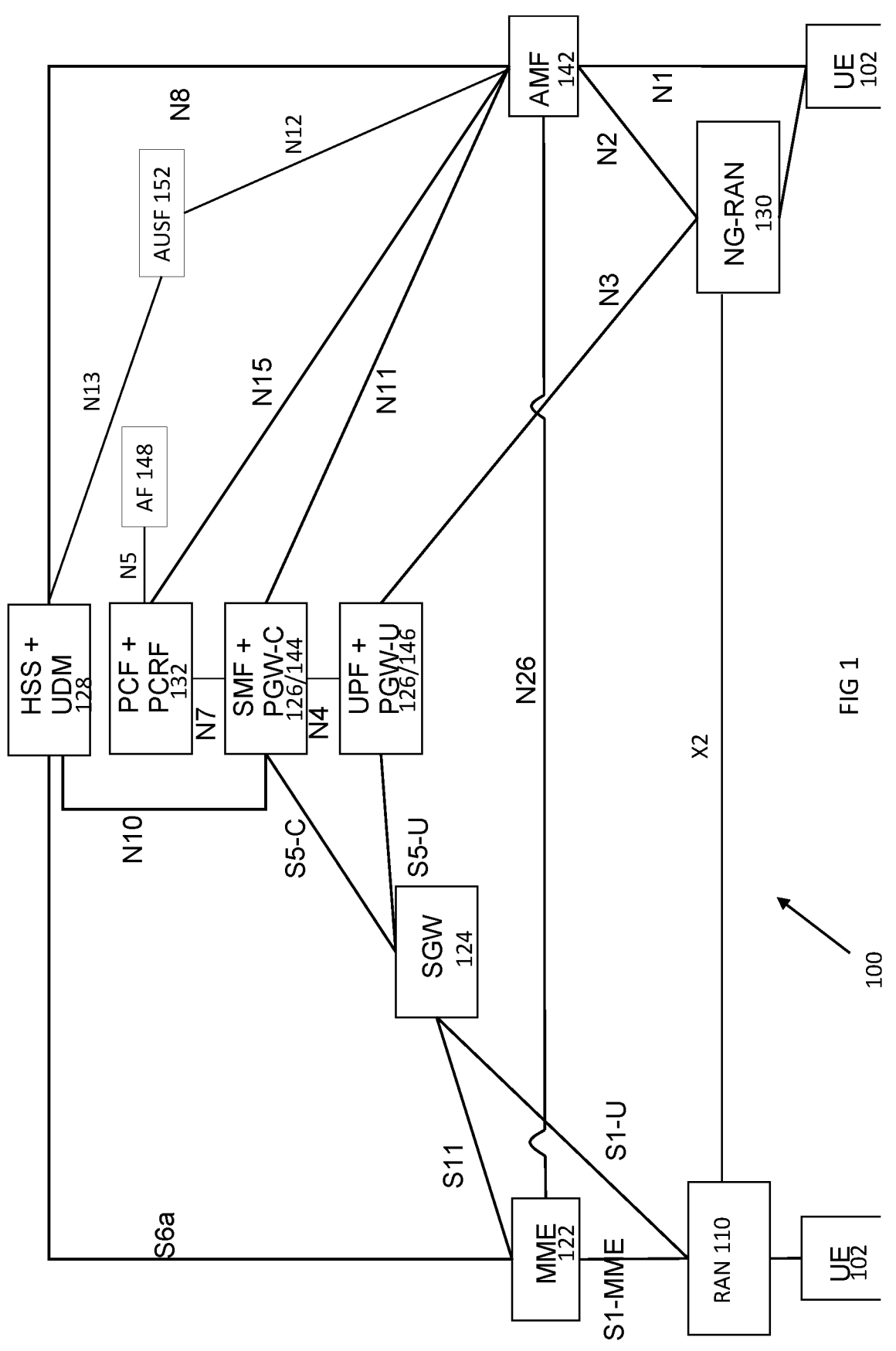
FIG. 1 illustrates combined communication system in accordance with some embodiments.

FIG. 1 illustrates a combined communication system in accordance with some embodiments. The system 100 includes 3GPP LTE/4G and NG network functions. Note that both LTE and 5G systems are shown, although as described below, steering of roaming information delivery may only apply to 5G systems and is sent over the non-access stratum control plane. A network function can be implemented as a discrete network element on a dedicated hardware, as a software instance running on dedicated hardware, or as a virtualized function instantiated on an appropriate platform, e.g., dedicated hardware or a cloud infrastructure.

The evolved packet core (EPC) of the LTE/4G network contains protocol and reference points defined for each entity. These core network (CN) entities may include a mobility management entity (MME) 122, serving gateway (S-GW) 124, and paging gateway (P-GW) 126.

In the NG network, the control plane and the user plane may be separated, which may permit independent scaling and distribution of the resources of each plane. The UE 102 may be connected to either an access network or Radio Access Network (RAN) 110 and/or may be connected to the NG-RAN 130 (gNB) or an Access and Mobility Function (AMF) 142. The RAN may be an eNB, a gNB or a general non-3GPP access point, such as that for Wi-Fi. The NG core network may contain multiple network functions besides the AMF 112. The network functions may include a User Plane Function (UPF) 146, a Session Management Function (SMF) 144, a Policy Control Function (PCF) 132, an Application Function (AF) 148, an Authentication Server Function (AUSF) 152 and Unified Data Management (UDM) 128. The various elements are connected by the NG reference points shown in FIG. 1.

The AMF 142 may provide UE-based authentication, authorization, mobility management, etc. The AMF 142 may be independent of the access technologies. The SMF 144 may be responsible for session management and allocation of IP addresses to the UE 102. The SMF 144 may also select and control the UPF 146 for data transfer. The SMF 144 may be associated with a single session of the UE 102 or multiple sessions of the UE 102. This is to say that the UE 102 may have multiple 5G sessions. Different SMFs may be allocated to each session. The use of different SMFs may permit each session to be individually managed. As a consequence, the functionalities of each session may be independent of each other. The UPF 126 may be connected with a data network, with which the UE 102 may communicate, the UE 102 transmitting uplink data to or receiving downlink data from the data network.

The AF 148 may provide information on the packet flow to the PCF 132 responsible for policy control to support a desired QoS. The PCF 132 may set mobility and session management policies for the UE 102. To this end, the PCF 132 may use the packet flow information to determine the appropriate policies for proper operation of the AMF 142 and SMF 144. The AUSF 152 may store data for UE authentication. The UDM 128 may similarly store the UE subscription data.

The gNB 130 may be a standalone gNB or a non-standalone gNB, e.g., operating in Dual Connectivity (DC) mode as a booster controlled by the eNB 110 through an X2 or Xn interface. At least some of functionality of the EPC and the NG CN may be shared (alternatively, separate components may be used for each of the combined component shown). The eNB 110 may be connected with an MME 122 of the EPC through an S1 interface and with a SGW 124 of the EPC 120 through an S1-U interface. The MME 122 may be connected with an HSS 128 through an S6a interface while the UDM is connected to the AMF 142 through the N8 interface. The SGW 124 may connected with the PGW 126 through an S5 interface (control plane PGW-C through S5-C and user plane PGW-U through S5-U). The PGW 126 may serve as an IP anchor for data through the internet.

The NG CN, as above, may contain an AMF 142, SMF 144 and UPF 146, among others. The eNB 110 and gNB 130 may communicate data with the SGW 124 of the EPC 120 and the UPF 146 of the NG CN. The MME 122 and the AMF 142 may be connected via the N26 interface to provide control information there between, if the N26 interface is supported by the EPC 120. In some embodiments, when the gNB 130 is a standalone gNB, the 5G CN and the EPC 120 may be connected via the N26 interface.

The system shown in FIG. 1 may also include a Policy and Charging Control (PCC) architecture. The PCC architecture may include, among others, an Application Function (AF), a Policy and Charging Rules Function (PCRF), a Policy and Control Enforcement Function (PCEF), a Subscription Profile Repository (SPR) that may store user policy charging control subscription information, a Bearer Binding and Event Reporting Function (BBERF), an Online Charging System (OCS) and an Offline Charging System (OFCS), an authentication, authorization, and accounting (AAA) server (not shown) that may handle UE requests for access to computer resources and provide authentication services and an Access Network Discovery and Selection Function (ANDSF) server that may provide discovery information to the UE about connectivity to 3GPP and non-3GPP access networks (such as Wi-Fi) that are owned by the UE operator or have roaming agreements with the UE operator.

The different functions may be provided in various servers and modules disposed throughout the RAN. A PCEF may be located in the VPLMN. Policy and charging rules may be transmitted from the home network PCRF (HPCRF) to the visited network PCRF (VPCRF) via an S9 interface. The rules may subsequently be transmitted to the visited network PCEF via a Gx interface and transmitted to the visited network BBERF via a Gxx interface. The visited network PCEF may be connected to the visited network OFCS and to the home network OCS via a Gy interface.

The PCRF may include the HPCRF and VPCRF. The PCRF may provide policy and charging rules to the PCEF 140 for enforcement. The PCRF may also compare the rules and the UE subscription information to ensure compliance. The PCRF may obtain information from the AF, SPR and the PCEF. More specifically, the AF may provide service information of the UE when the UE attaches to the RAN and parameter negotiation is performed. The PCRF may accept the negotiation if the service information is consistent with the PCRF policy or may reject the negotiation and provide service parameters acceptable to the PCRF to the AF, which may subsequently return the acceptable parameters to the UE.

Similarly, in some embodiments, the PCEF may provide RAN information related to the bearer to the PCRF. The PCEF may enact the PCRF policy and charging rules on the service data flow on the bearer plane. The PCEF may control service flows dependent on the UE QoS according to the PCRF rules after a bearer is established. The PCEF may also implement online and/or offline charging dependent on the PCRF charging rules. The PCEF may correspondingly communicate with the OCS for online charging and OFCS for offline charging to obtain charging information. The PCEF may be located inside the serving GW, PDN GW or Evolved Packet Data Gateway (ePDG).

The BBERF may be disposed in the serving GW, another PDN GW (not shown) or the ePDG. The gateway may depend on whether the UE accesses the RAN via the E-UTRAN (S-GW), a trusted non-3GPP network (other PDN GW) or an untrusted non-3GPP access system (ePDG). The ePDG may secure data transmission between a UE and the EPC using an untrusted non-3GPP access by acting as a termination node of IPsec tunnels established with the UE. One example of untrusted access may be a connection over a public Wi-Fi hotspot or other network connection that a network operator may not consider trustable from a security standpoint. The ePDG may map IPSec tunnels into General Packet Radio Service (GPRS) Tunneling Protocol (GTP) or Proxy Mobile IPv6 (PMIP) tunnels terminated at the PDN GW. Note that while only a single one of each gateway is shown, there may be a plurality of each of one or more of the different gateways, such as the ePDG. Moreover, the elements shown, such the EPC, ePDG, E-UTRAN, etc., may be present in each of the VPLMN and HPLMN.

Figure 2:
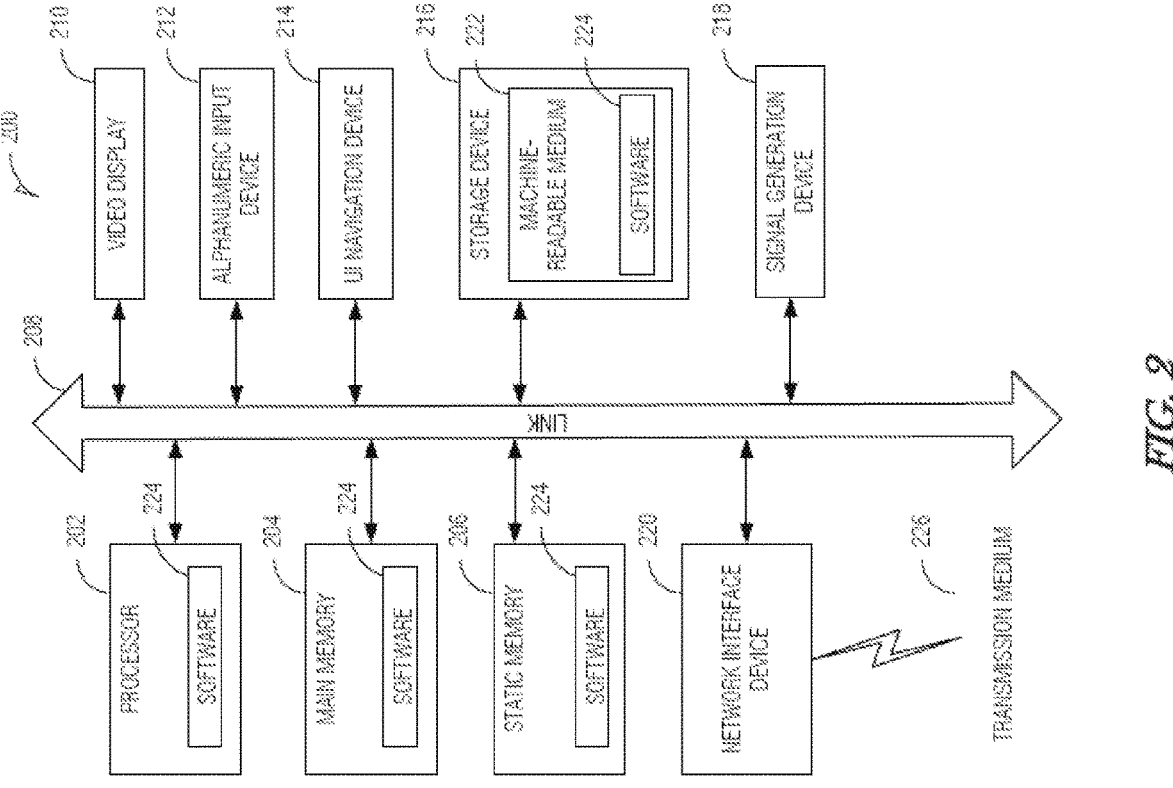
FIG. 2 illustrates a block diagram of a communication device in accordance with some embodiments.

FIG. 2 illustrates a block diagram of a communication device in accordance with some embodiments. In some embodiments, the communication device may be a peer machine in peer-to-peer (P2P) (or other distributed) network environment. The communication device 200 may be a specialized computer, a personal or laptop computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine. In some embodiments, the communication device 200 may be embedded within other, non-communication based devices such as vehicles and appliances.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include:

non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/5th generation (5G) standards among others. In an example, the network interface device 220 may include one or more physical jacks (e.g., Ethernet, coaxial, or phone jacks) or one or more antennas to connect to the transmission medium 226.

In general, both legacy and 5G UEs are mobile. Thus, a UE may use VPLMN resources and policies when roaming from its home public land mobile network (HPLMN). Steering of roaming, in which the home mobile operator with which the UE has subscription determines which partner their subscribers use when roaming, may only increase in complexity with the influx of 5G systems and providers. Such steering may be network-based or Universal Subscriber Identity Module (USIM)-based. Network-based steering of roaming uses the SS7 gateway next to the SCCP gateway on the home network side. When the UE attempts to connect for approval of the hosting network, a request is sent to the home network. The request use SS7 signaling. If the home network service does not permit the UE to use the service, the UE may be forwarded to try another hosting network. SIM-based steering uses an updatable network list of preferred mobile operators (PLMNs) on a SIM card of the UE which may be periodically updated through operator specific mechanisms such as OTA.

Steering of Roaming for UEs roaming to VPLMN networks for 3GPP access may take into account various features. These features may include permitting the HPLMN to update a list of preferred PLMN/access technology combinations at the UE via non-access stratum (NAS) signalling. The HPLMN may update the list of preferred PLMN/access technology combinations, e.g. depending on the PLMN where the UE is registered or when required by HPLMN operator policies. The VPLMN, however, should not be permitted to modify the list of preferred PLMN/access technology combinations sent by the HPLMN. The UE should be able to verify the integrity of the received list of preferred PLMN/access technology combinations. The UE should be able to successfully establish its IMS emergency session or IMS eCall in shortest possible time in a highly reliable way, which should not be jeopardized by steering of roaming related enhancements. In addition, PLMN selection in 5GMM-Connected mode should not be impacted by any changes.

There may be several ways to update the list of preferred PLMN/access technology combinations. Short Message Service (SMS) transport alone, however, may not be reliable or fast enough to be used as a reliable transport for updating the preferred PLMN list(s) in the USIM and thus may be inadequate to provide a reliable and fast Steering of Roaming mechanism based on operator requirements for 5G Systems. Further, end-to-end security may be an issue with an SMS-based solution and, it has been reported that in some cases SMS messages can be detected by VPLMNs and may be discarded or blocked altogether in roaming cases, to prevent the HPLMN from steering roaming customers to other preferred VPLMNs.

Instead of using SMS messages, a native NAS-based transport mechanism may be used to transport the list of preferred PLMNs and access networks to the UE. The NAS transport can be based on one of the following three mechanisms or a combination thereof: configuration command messages, generic NAS transport messages and/or messages used during registration procedure.

In general, the HJPLMN may configure the USIM of the UE to indicate that the UE is expected to receive the steering of roaming information due to initial registration in a VPLMN. The HJPLMN may also indicate in the subscription information of the UDM that the UE is expected to receive the steering of roaming information due to initial registration in a VPLMN. In addition, the HJPLMN can request the UE to provide an acknowledgement of successful reception/verification of the steering of roaming information.

If the USIM of the UE is configured to indicate that the UE is to expect to receive the steering of roaming information during initial registration procedure but did not receive the steering of roaming information or security check on the steering of roaming information fails, the current chosen VPLMN is not contained in the list of "PLMNs where registration was aborted due to SOR", the current chosen VPLMN is not part of "User Controlled PLMN Selector with Access Technology" list and the UE is not in manual mode of operation, the UE may perform PLMN selection with the current VPLMN considered as lowest priority. The VPLMN transparently forwards to the UE the steering of roaming information received from HIPLMN and transparently forward to the HIPLMN the acknowledgement of successful reception or security check of the steering of roaming information received from UE, both while the UE is trying to register onto the VPLMN and after the UE has registered onto the VPLMN.

The NAS transport can either use the existing over the air (OTA) protocol to package the list of preferred PLMNs and access technologies in NAS transport or the NAS transport can define a new mechanism such as a set of Information Elements (IEs) natively in 3GPP to transport the preferred list of PLMNs from the HPLMN to the UE. The mechanism may be integrity and confidentiality protected to provide end-to-end security. Further, to ensure reliable delivery of packets that contain the preferred list of PLMNs, an acknowledgement at the NAS transport level may be used.

In some embodiments, a secured packet may be used to steer a UE in a VPLMN using NAS may contain a list of preferred PLMN/access technology combinations and an indication indicating a desire to transmit the result of an integrity check of the packet. The secured packet is an information flow on top of which the level of required security has been applied. The secured packet has a security header that consists of all security of the information (e.g. counter, key identification, indication of security level, checksum or Digital Signature). Upon receipt of a DL NAS TRANSPORT message or a REGISTRATION ACCEPT message with a secured packet related to steering a UE in a VPLMN using NAS in a payload container IE, the secured packet may be delivered to the USIM. The payload container type IE part of the UL NAS TRANSPORT message or a REGISTRATION COMPLETE message is set to "secured packet." Upon receipt of a secured packet related to steering a UE in a VPLMN using NAS from the USIM, the UE may transmit the packet in the payload container IE of a UL NAS TRANSPORT message or a REGISTRATION ACCEPT message. The payload container type IE part of the UL NAS TRANSPORT message or a REGISTRATION COMPLETE message is set to "secured packet." A secured packet delivered using the network-initiated NAS transport procedure may be opaque, the device may not know what is contained. However, when delivering a secured packet using mechanisms specified in 3GPP TS 31.111, the mechanisms used may indicate that the secured packet contains the results of an integrity check.

Figure 3:
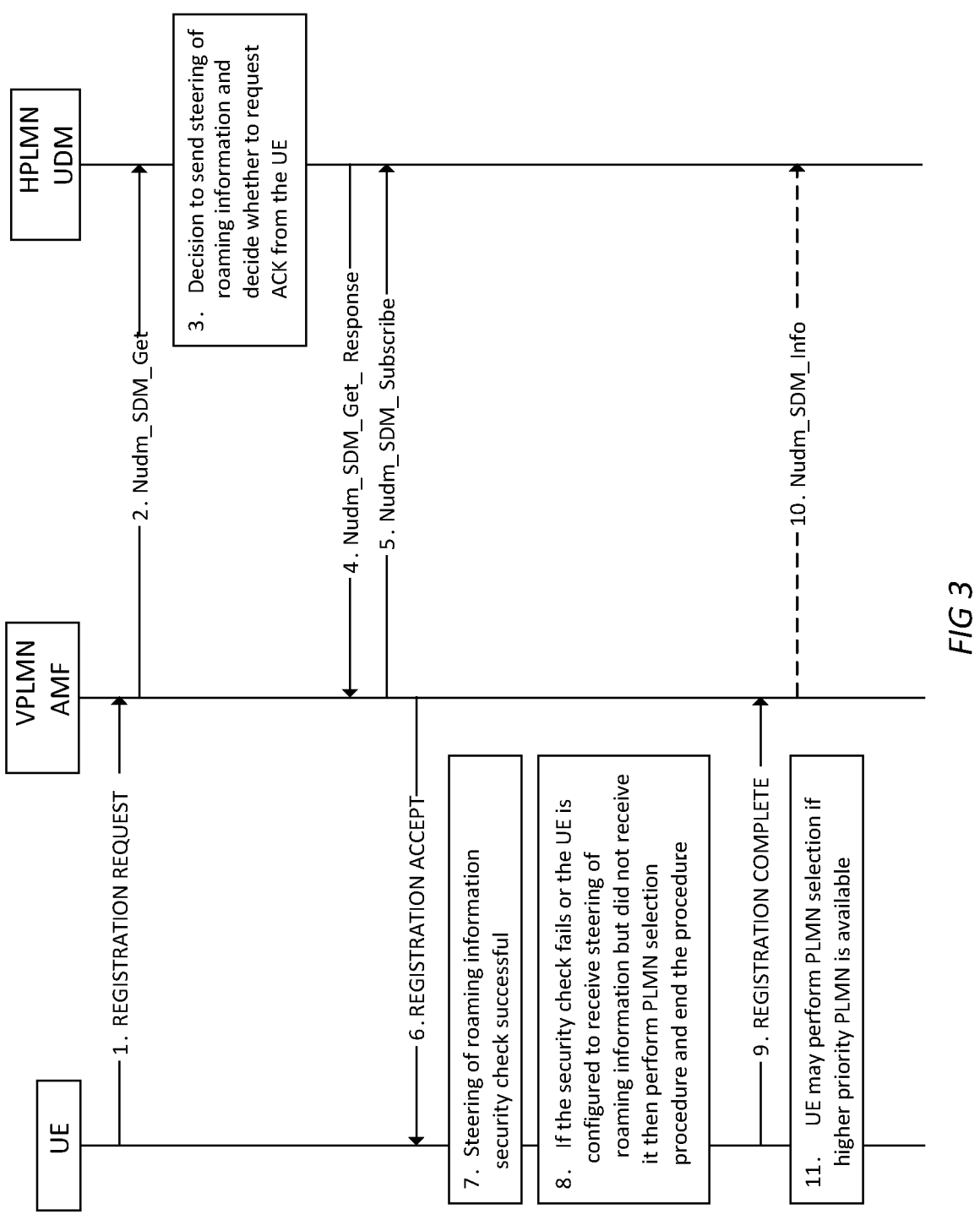
FIG. 3 illustrates a method of providing a list of preferred PLMN/access technology combinations in accordance with some embodiments.

FIG. 3 illustrates a method of providing a list of preferred PLMN/access technology combinations in accordance with some embodiments. FIG. 3 shows the interactions of the UE, the VPLMN AMF, and the HPLMN UDM (via the HPLMN AUSF) for delivery of a secured packet using NAS transport procedures. Steering of roaming information may be provided during authentication, but after authentication in REGISTRATION ACCEPT message, with the acknowledgement being conveyed by the UE in the REGISTRATION COMPLETE message. As shown, the procedure may be initiated when the UE initially registers with the VPLMN AMF or during a mobility-initiated registration. The UE may initiate registration by sending a NAS REGISTRATION REQUEST message to the VPLMN AMF. The REGISTRATION REQUEST message may initiate the registration procedure.

The VPLMN AMF may invoke the Nudm_SDM_Get service operation message to the HPLMN UDM to obtain, amongst other information, the Access and Mobility Subscription data for the UE. If the user subscription information indicates to send the steering of roaming information due to initial registration in a VPLMN, then the HPLMN UDM may provide the steering of roaming information to the UE when the UE performs initial registration in a VPLMN. Otherwise, the HPLMN UDM may provide the steering of roaming information to the UE, based on operator policy. The steering of roaming information may provide a list of preferred PLMN/access technology combinations for the UE. The HPLMN UDM may decide to provide the list to the UE only for first registration of the UE in the VPLMN—otherwise the VPLMN may avoid periodic re-authentication of the UE.

The HPLMN UDM may send a response to the Nudm_SDM_Get service operation to the VPLMN AMF. The response may include the steering of roaming information within the Access and Mobility Subscription data. The HPLMN may also request the UE to acknowledge a successful security check of the received steering of roaming information, by providing the acknowledgment as part of the steering of roaming information in the Nudm_SDM_Get response service operation.

The VPLMN AMF may also invoke the Nudm_SDM_Subscribe service operation to the HPLMN UDM to subscribe to notification of changes of the subscription data received in the response. The notification may include notification of updates of the steering of roaming information included in the Access and Mobility Subscription data.

The VPLMN AMF may send the received steering of roaming information to the UE in a REGISTRATION ACCEPT message that is in response to the REGISTRATION REQUEST message. In some embodiments, the steering of roaming information may be sent transparently to the UE.

After receiving steering of roaming information, the UE may undertale a security check of the steering of roaming information. If the security check of the steering of roaming information is successful, and if the steering of roaming information contains a secured packet, the secured packet may be uploaded to the USIM. If the steering of roaming information contains the list of preferred PLMN/access technology combinations, the UE may replace the highest priority entries in the "Operator Controlled PLMN Selector with Access Technology" list stored in the UE with the received list of preferred PLMN/access technology combinations.

In some cases, the UE may release the current N1 NAS signalling connection locally, store the PLMN identity in a list of "PLMNs where registration was aborted due to SOR" and attempt to obtain service on a higher priority PLMN by acting as if timer T that controls periodic attempts (of PLMN selection) has expired, with an exception that the current PLMN is considered as lowest priority. This may be based on what information is contained in the REGISTRATION ACCEPT message, whether the security check is successful, as well as the operator list of allowable VPLMNs. The UE may also locally release the established N1 NAS signalling connection if, after an implementation-dependent time, the UE is still in 5GMM-CONNECTED mode or 5GMM-CONNECTED mode with a RRC inactive indication.

Specifically, the REGISTRATION ACCEPT message may, as above, contain some or all of the list of preferred PLMN/access technology combinations, the secured packet and/or the HPLMN indication. The HPLMN indication may indicate that 'no change of the "Operator Controlled PLMN Selector with Access Technology" list stored in the UE is needed and thus no list of preferred PLMN/access technology combinations is provided'. In some cases, the USIM has an indication that the UE is to receive the steering of roaming information due to initial registration in a VPLMN. Even if this is the case, the REGISTRATION ACCEPT message may not contain any of the above information when the UE performs initial registration in a VPLMN or the steering of roaming information is received but the security check is not successful. Alternatively, the current chosen VPLMN may not be contained in the list of "PLMNs where registration was aborted due to SOR", may not part of "User Controlled PLMN Selector with Access Technology" list, the UE may not be in manual mode of operation and the PDU session for emergency services may not be pending to be activated. If these are the case, the UE may, as above, undertake PLMN selection and end the SOR procedure.

If the UDM has requested an acknowledgement from the UE and the steering of roaming information in the REGISTRATION ACCEPT message has successfully passed the security check, the UE may send a REGISTRATION COMPLETE message to the serving AMF. The REGISTRATION COMPLETE message may contain an SOR transparent container including the UE acknowledgement.

If an SOR transparent container is received in the REGISTRATION COMPLETE message, the AMF may use the Nudm_SDM_Info service operation to provide the received SOR transparent container to the UDM. If the UE acknowledges the successful security check of the received steering of roaming information, the UDM may verify that the acknowledgement is provided by the UE.

If the UE has a list of available PLMNs in the area and based on this list the UE determines that there is a higher priority PLMN than the currently camped chosen VPLMN and the UE is in automatic network selection mode, then the UE may attempt to obtain service on a higher priority PLMN by acting as if timer T that controls periodic attempts has expired after the release of the N1 NAS signalling connection. If the N1 NAS signaling connection is not released after implementation dependent time, the UE may locally release the N1 signaling connection.

The UE may also perform the above SOR procedure for emergency services. Specifically, the UE may perform the registration procedure for emergency services while the UE has a valid USIM and the AMF performs the authentication procedure.

Figure 4:
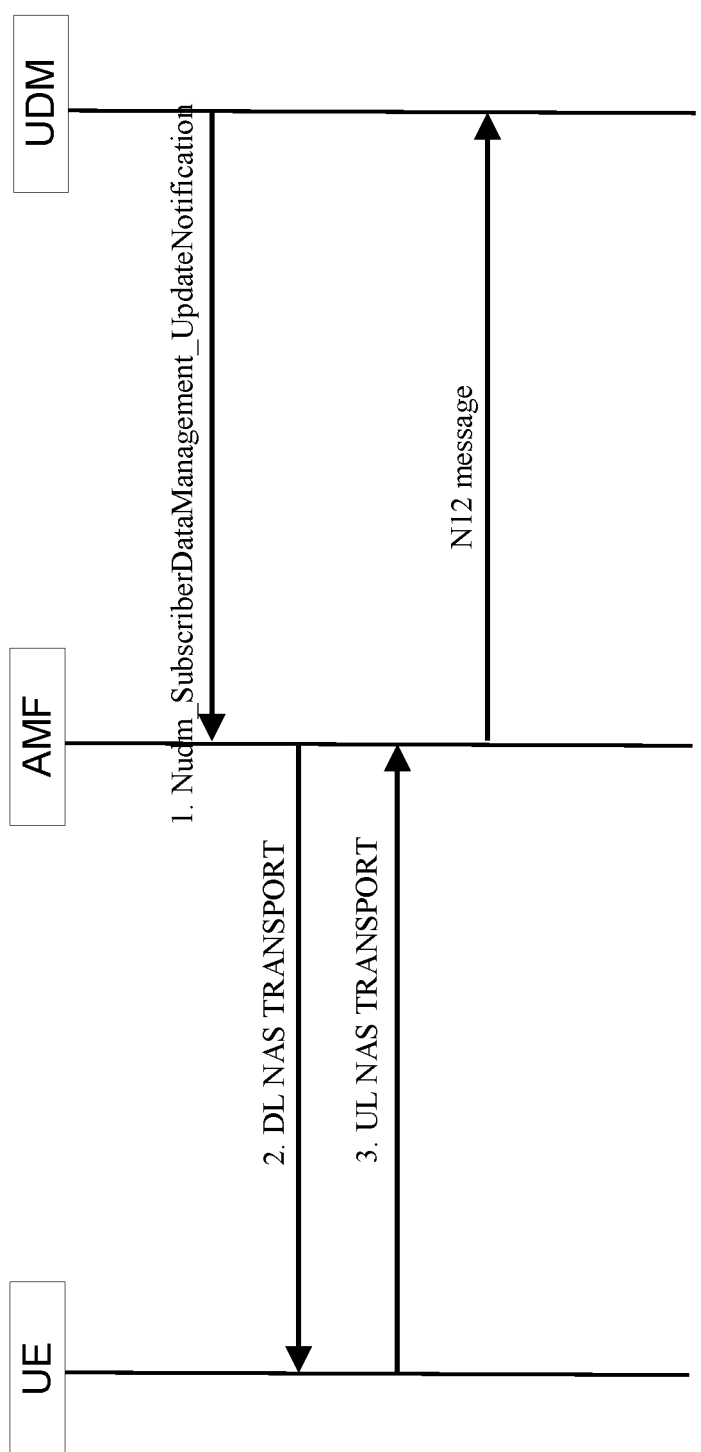
FIG. 4 illustrates a method of providing a list of preferred PLMN/access technology combinations after registration in accordance with some embodiments.

In some embodiments, NAS transport messages (Uplink and Downlink) can be used to update parameters in the UE. FIG. 4 illustrates a method of providing a list of preferred PLMN/access technology combinations after registration in accordance with some embodiments. The NAS transport procedures may provide transport of a payload between the UE and the AMF. The type of the payload is identified by the payload container type IE and includes one of the following: a single 5GSM message, SMS, an LTE Positioning Protocol (LPP) message, or a secured packet. A UE-initiated NAS transport procedure may, in addition to the above payloads, also provide associated payload routing information from the UE to the AMF in a 5GMM message.

As shown in FIG. 4, the NAS transport messages can also be used in combination with OTA communications. The UDM may determine that an update to the list should be performed at the UE. The UDM may notify the changes of the user profile to the affected AMF by invoking the Nudm_SDM_Notification service operation. The Nudm_SDM_Notification service operation contains the steering of roaming information to be delivered transparently to the UE over NAS within the Access and Mobility Subscription data. If the HPLMN decided that the UE is to acknowledge successful security check of the received steering of roaming information, the Nudm_SDM_Notification service operation also contains an indication that the UDM requests an acknowledgement from the UE as part of the steering of roaming information.

The AMF may transmit a DL NAS transport message to the UE. The AMF includes in the DL NAS TRANSPORT message the steering of roaming information received from the UDM. The steering of roaming information may be contained in a payload container that contains an OTA message coded the same way as an OTA SMS message.

The OTA message may be forwarded (and uploaded) to the USIM and the list of preferred PLMNs updated by the UE after a successful integrity and confidentiality check on the list of preferred PLMN/access technology combinations included in the DL NAS TRANSPORT message to verify that the list of preferred PLMN/access technology combinations is provided by HPLMN. In some cases, the UE may wait until it moves to idle mode or 5GMM-CONNECTED mode with RRC inactive before attempting to obtain service on a higher priority PLMN by acting as if the timer T that controls periodic attempts has expired. If the last established PDU session is an emergency PDU session, the UE may attempt to perform the PLMN selection after the release of the emergency PDU session and expiration of timer T.

If the UDM has requested an acknowledgement from the UE in the DL NAS TRANSPORT message and the security check was successful, the UE may send an UL NAS TRANSPORT message to the serving AMF with an SOR transparent container including the UE acknowledgement.

If the UL NAS TRANSPORT message with an SOR transparent container is received, the AMF uses the Nudm_SDM_Info service operation through the N12 interface to provide the received SOR transparent container to the UDM. If the HPLMN decided that the UE is to acknowledge successful security check of the received list of preferred PLMN/access technology combinations, the UDM may verify that the acknowledgement is provided by the UE.

For a UE-initiated NAS transport procedure, in the connected mode, the UE may initiate the NAS transport procedure by sending a UL NAS TRANSPORT message. The payload container type IE may be set to "secured packet." For a network-initiated NAS transport procedure, upon reception of a DL NAS TRANSPORT message, if the payload container type IE is set to "secured packet" the UE may forward the content of the payload container IE to the USIM.

The payload container type IE is a type 1 IE with a length of ½ an octet. The payload container type IE indicates type of payload included in the payload container IE. The payload container IE may be coded as shown below:

TABLE 1

| Payload container IE | | | | | | | | |
|---|---|---|---|---|---|---|---|---|
| 8 | 7 | 6 | 5 | 4 | 3 | 2 | 1 | |
| — | — | — | — | Payload container type value | | | | octet 1 |

| Payload container type value (octet 1, bit 1 to bit 4) | | | | |
|---|---|---|---|---|
| Bits | | | | |
| 4 | 3 | 2 | 1 | |
| 0 | 0 | 0 | 1 | N1 SM information |
| 0 | 0 | 1 | 0 | SMS |
| 0 | 0 | 1 | 1 | LTE Positioning Protocol (LPP) message container |
| 0 | 1 | 0 | 0 | Secured packet/SOR transparent container |
| | | | | All other values are reserved. |

The secured packet may use SMS point to point, SMS cell broadcast, unstructured supplementary service data or hyper text transfer protocol.

Figure 5:
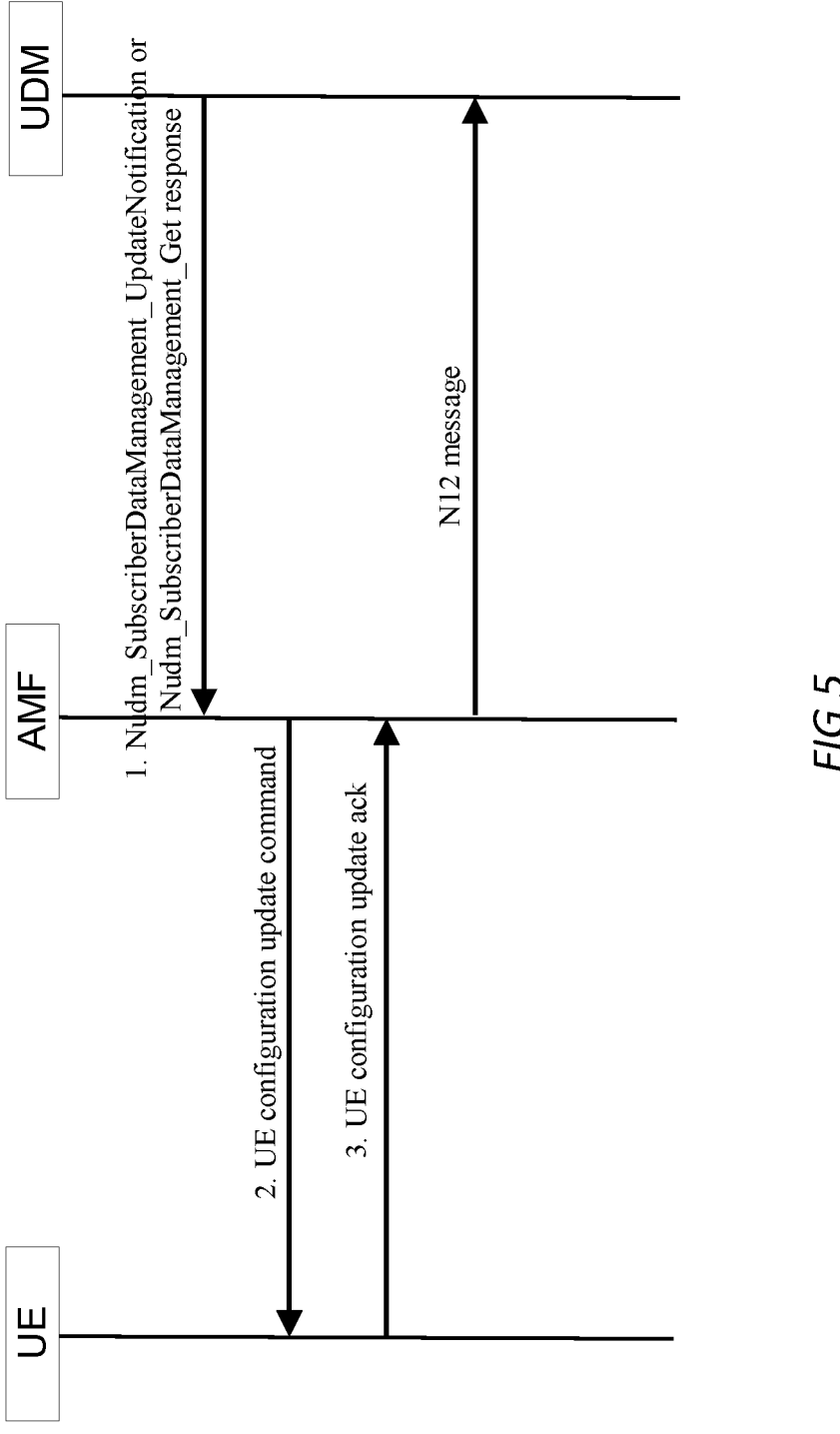
FIG. 5 illustrates a method of providing a list of preferred PLMN/access technology combinations using a configuration update procedure in accordance with some embodiments.

In some embodiments, configuration updates can be used to update parameters in the UE. FIG. 5 illustrates a method of providing a list of preferred PLMN/access technology combinations using a configuration update procedure in accordance with some embodiments.

The UE configuration update procedure can be used in combination with OTA. The UDM may determine that an update to the list should be performed at the UE. The UDM may send an update notification message or a "get response" message to the AMF. The AMF may transmit a UE configuration update command to the UE. The UE configuration update command can include a container which contains an OTA message coded the same way as an OTA SMS message. The OTA message may be forwarded to the USIM and the list of preferred PLMNs is updated after a successful integrity and confidentiality check. The UE may respond to the successful or unsuccessful update using a UE configuration update acknowledgment to the AMF, which may forward the information to the UDM via a message passed through the N12 interface.

If the UE receives a USAT REFRESH command qualifier, the UE may replace the highest priority entries in the "Operator Controlled PLMN Selector with Access Technology" list stored in the UE with the list provided in the REFRESH command. The UE may delete the PLMNs identified by the list in the REFRESH command from the Forbidden PLMN list and from the Forbidden PLMNs for GPRS service list, if they are present in these lists. This includes any information stored in the SIM and the UE internal memory. The UE may take the new information into account in subsequent attempts to access a higher priority PLMN. The UE may attempt to obtain service on a higher priority PLMN by acting as if a timer T that controls periodic attempts has expired.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
a processor configured to, when executing instructions stored in a memory, cause a Unified Data Management (UDM) of a home public land mobile network (HPLMN) to perform operations comprising:
transmitting steering of roaming information to an Access and Mobility Function (AMF) of a visited public land mobile network (VPLMN) for delivery to a universal subscriber identity module (USIM) of a user equipment (UE) in a downlink non-access stratum (DL NAS) TRANSPORT message after registration,
wherein the DL NAS TRANSPORT message comprises an indication set to "0 1 0 0" indicating that the DL NAS TRANSPORT message includes a secured packet for delivery to the USIM.

2. The apparatus of claim 1, wherein delivery of the secured packet occurs after a successful integrity check.

3. The apparatus of claim 1, wherein the indication set to "0 1 0 0" is used to differentiate a payload container from other potential payload container types including N1 session management (SM) information, Short Message Service (SMS), and a long term evolution (LTE) Positioning Protocol (LPP) message.

4. The apparatus of claim 3, wherein a payload container type IE is a type 1 IE with a length of ½ an octet having a bit sequence, starting with a most significant bit, of 0100 to indicate the steering of roaming information.

5. The apparatus of claim 3, wherein the steering of roaming information indicates a list of preferred PLMN/access technology combinations.

6. The apparatus of claim 1, wherein the operations further comprise:
receiving, from the UE, an acknowledgement of the UE's reception of the steering of roaming information.

7. A method, comprising:
by an Access and Mobility Function (AMF) of a visited public land mobile network (VPLMN):
generating a downlink non-access stratum (DL NAS) TRANSPORT message that includes an indication set to "0 1 0 0" indicating that the DL NAS TRANSPORT message includes a secured packet for delivery to a universal Subscriber Identity Module (USIM), wherein steering of roaming information provided by a home public land mobile network (HPLMN) is provided in the secured packet; and
transmitting the DL NAS TRANSPORT message to a user equipment (UE) after registration.

8. The method of claim 7, wherein the secured packet is configured to be uploaded to the USIM after a successful integrity check.

9. The method of claim 7, wherein the indication set to "0 1 0 0" is used to differentiate a payload container from other potential payload container types including N1 session management (SM) information, Short Message Service (SMS), and a long term evolution (LTE) Positioning Protocol (LPP) message.

10. The method of claim 9, wherein a payload container type IE is a type 1 IE with a length of ½ an octet having a bit sequence, starting with a most significant bit, of 0100 to indicate the steering of roaming information.

11. The method of claim 9, wherein the steering of roaming information indicates a list of preferred PLMN/access technology combinations.

12. The method of claim 7, further comprising:
receiving, from the UE, an uplink (UL) NAS TRANSPORT message that includes an acknowledgement of the UE's reception of the steering of roaming information.

13. A method, comprising:
receiving, at a user equipment (UE) after registration, a downlink (DL) non-access stratum (NAS) TRANSPORT message from an Access and Mobility Function (AMF) of a visited public land mobile network (VPLMN);
determining, upon reception of the DL NAS TRANSPORT message, if the DL NAS message includes an indication indicating that the DL NAS TRANSPORT message includes a secured packet, wherein steering of roaming information from a home public land mobile network (HPLMN) is provided in the secured packet; and
delivering, based at least in part on determining if the DL NAS message includes an indication set to "0 1 0 0" indicating that the DL NAS TRANSPORT message includes a secured packet, the secured packet to a Universal Subscriber Identity Module (USIM).

14. The method of claim 13, wherein delivering the secured packet is performed after a successful integrity check.

15. The method of claim 13, further comprising:
determining that the DL NAS TRANSPORT message contains the steering of roaming information in response to a determination that the indication set to "0 1 0 0" is used to differentiate a payload container from other potential payload container types including N1 session management (SM) information, Short Message Service (SMS), and a long term evolution (LTE) Positioning Protocol (LPP) message.

16. The method of claim 15, wherein the steering of roaming information indicates a list of preferred PLMN/access technology combinations.

17. The method of claim 16, further comprising:
performing a security check on the steering of roaming information to verify that the list of preferred PLMN/access technology combinations is provided by HPLMN prior to uploading the steering of roaming information to a memory of the UE.

18. The method of claim 13, wherein a type value provides the indication in the DL NAS message indicating the DL NAS includes the secured packet.

19. The method of claim 13, the DL NAS TRANSPORT message comprises a payload container type information element (IE) further comprising a first octet with a third bit set to a value of one to indicate the secured packet.

20. The method of claim 19, wherein the third bit set to a value of one further indicates a steering of roaming (SOR) transparent container.

* * * * *